US011305801B2

(12) United States Patent
Killy

(10) Patent No.: US 11,305,801 B2
(45) Date of Patent: Apr. 19, 2022

(54) SHOPPING CART AND ASSOCIATED METHODS

(71) Applicant: Rosemonde W. Killy, Windermere, FL (US)

(72) Inventor: Rosemonde W. Killy, Windermere, FL (US)

(*) Notice: Subject to any disclaimer, the term of this patent is extended or adjusted under 35 U.S.C. 154(b) by 0 days.

(21) Appl. No.: 17/197,590

(22) Filed: Mar. 10, 2021

(65) Prior Publication Data
US 2021/0188338 A1 Jun. 24, 2021

Related U.S. Application Data

(60) Provisional application No. 63/100,493, filed on Mar. 16, 2020.

(51) Int. Cl.
B62B 3/18 (2006.01)

(52) U.S. Cl.
CPC ..................... B62B 3/18 (2013.01)

(58) Field of Classification Search
CPC .................. B62B 3/18; B62B 3/182
See application file for complete search history.

(56) References Cited

U.S. PATENT DOCUMENTS

| | | |
|---|---|---|
| 2,901,262 A | 8/1959 | Berlin |
| 2,962,292 A | 11/1960 | Edmonston |
| 3,052,484 A | 9/1962 | Huffman |
| 3,245,498 A | 4/1966 | Stanley |
| 3,272,528 A | 9/1966 | Young |
| 3,827,376 A | 8/1974 | Solomon |
| 4,116,456 A | 9/1978 | Stover |
| 4,429,897 A | 2/1984 | Friedman |
| 4,763,919 A | 8/1988 | Nakao |
| 4,953,878 A | 9/1990 | Sbragia |
| 4,978,013 A | 12/1990 | Hogg |
| 4,984,704 A | 1/1991 | O'Malley |
| 5,048,649 A | 9/1991 | Carpenter |
| 5,197,579 A | 3/1993 | Bieber |
| 6,070,899 A | 6/2000 | Gines |
| 6,126,181 A | 10/2000 | Ondrasik |
| 6,378,890 B1 | 4/2002 | Cheng |
| 6,390,496 B1 | 5/2002 | Eicher |
| 6,536,786 B1 | 3/2003 | Katoozian |
| 6,540,239 B2 | 4/2003 | Lee |
| 6,752,088 B2 | 6/2004 | Poarch |
| 6,793,223 B2 | 9/2004 | Ondrasik |
| 6,830,253 B1 | 12/2004 | Porras |
| 6,866,289 B2 | 3/2005 | Wurx |
| 6,880,851 B1 | 4/2005 | Summers |
| 6,926,291 B1 | 8/2005 | Ondrasik |

(Continued)

Primary Examiner — Brian L Swenson

(57) ABSTRACT

The cart may include a plurality of fastening members attached to the outer frame of the first side panel, second side panel, front panel and end panel. Additionally, there may be a plurality of rotational members attached to the outer frame of the first side panel, second side panel and end panel. the first side panel, second side panel, and end panel are removably attached to the cart via the first side panel, second side panel, front panel, and end panel that itself may be rotatable, removable, or both. Some embodiments include a kit for converting a standard shopping cart to an improved shopping cart. Some embodiments include the improved cart as a flat bed shopping cart with three downwardly foldable panels.

3 Claims, 14 Drawing Sheets

(56) References Cited

U.S. PATENT DOCUMENTS

| | | | |
|---|---|---|---|
| 7,168,715 B1 | 1/2007 | Friedman | |
| 7,195,155 B2 | 3/2007 | Garberg | |
| 7,273,216 B1 | 9/2007 | Hohrman | |
| 7,597,332 B2 | 10/2009 | Thompson | |
| 8,408,581 B1 | 4/2013 | Hunter | |
| 9,102,345 B2 | 8/2015 | Geva et al. | |
| 9,126,610 B1* | 9/2015 | Abiri | B62B 5/0003 |
| 9,540,024 B2 | 1/2017 | Iryami | |
| 9,573,610 B1* | 2/2017 | Chaturvedi | B62B 3/005 |
| 9,598,097 B2 | 3/2017 | Sherman | |
| D786,524 S | 5/2017 | Sherman | |
| D800,408 S | 10/2017 | Sherman | |
| D802,867 S | 11/2017 | Sherman | |
| D802,868 S | 11/2017 | Sherman | |
| D802,869 S | 11/2017 | Sherman | |
| D802,870 S | 11/2017 | Sherman | |
| D822,304 S | 7/2018 | Walter | |
| 11,059,508 B1* | 7/2021 | Byrd | B62B 5/065 |
| 2002/0167139 A1* | 11/2002 | Prather | B62B 3/146 280/47.35 |
| 2003/0197339 A1 | 10/2003 | Felipe | |
| 2003/0214478 A1 | 11/2003 | Yoo | |
| 2004/0051267 A1 | 3/2004 | Hjorth | |
| 2005/0140119 A1 | 6/2005 | Wong | |
| 2005/0166861 A1 | 8/2005 | King | |
| 2006/0027983 A1 | 2/2006 | Pederson | |
| 2008/0093813 A1 | 4/2008 | Kemp | |
| 2008/0185803 A1 | 8/2008 | Anthony | |
| 2008/0265534 A1 | 10/2008 | Ondrasik | |
| 2009/0174161 A1 | 7/2009 | Alves | |
| 2009/0206568 A1 | 8/2009 | Lee | |
| 2011/0068069 A1 | 3/2011 | Starsiak | |
| 2011/0115178 A1 | 5/2011 | De Sousa | |
| 2012/0274052 A1* | 11/2012 | Zhu | B62B 3/027 280/651 |
| 2012/0286484 A1 | 11/2012 | Gonzalez | |
| 2013/0001904 A1 | 1/2013 | Macias | |
| 2013/0285340 A1 | 10/2013 | Esteban Guallar | |
| 2014/0183844 A1* | 7/2014 | Iryami | B62B 3/022 280/659 |
| 2018/0258965 A1* | 9/2018 | Danko | A63H 33/046 |

* cited by examiner

SHOPPING CART AND ASSOCIATED METHODS

RELATED APPLICATION

This application claims the benefit under 35 U.S.C. § 119(e) of U.S. Provisional Patent Application Ser. No. 63/100,493 titled " . . . a shopping cart having one, two, or three side panels fold down 180 degrees . . . " filed on Mar. 16, 2020, the entire contents of which are incorporated herein by reference.

FIELD OF THE INVENTION

The present invention relates to systems and methods for loading and unloading goods into a shopping cart. More particularly, the present invention relates to a structurally improved shopping cart and associated methods.

BACKGROUND

The traditional metal, plastic, and plastic-hybrid framed shopping cart is used by millions of people worldwide to accumulate their goods while shopping as well as to unload their goods into their vehicle. Loading goods into the shopping cart requires the consumer to hoist them over top of the side panel of the cart and drop the goods into the cart bin. For heavier items, the traditional shopping cart requires the consumer to bend over and place them on the rack under the cart. This of course, assumes that the heavier item is small enough to fit into the bottom shelf space provided by the cart.

Unloading the goods is equally burdensome requiring the user to bend over the side panels, reach into the cart, and hoist the goods out from overtop of the panels. Loading and unloading heavy items such as milk gallons and large packs of water into the shopping cart becomes problematic for a large segment of the public that may not be tall enough to hoist a heavy item overtop of the panels. It is also problematic for elderly and fragile segments of the public that lack the necessary strength or agility to perform this movement. There exists a need in the art for a shopping cart that accommodates these affected shoppers. There exists a need in the art for an improved shopping cart and associated methods.

This background is provided to reveal information believed by the applicant to be of possible relevance to the present invention. No admission is made as to prior art and nothing within the background should be construed as prior art against the present.

SUMMARY OF THE INVENTION

Embodiments of the invention are directed to an improved shopping cart including a first side panel, a second side panel, a front panel, a bottom panel, and end panel with a plurality of fastening members attached to the outer frame of the first side panel, second side panel, and end panel. It may include a plurality of rotation facilitating members attached to the outer frame of at least one of the first side panel, second side panel and end panel. The end panel is removably attached to at the first side panel, second side panel, and bottom panel. Furthermore, at least one of the first side panel, second side panel, and end panel is rotatable and removable with respect to the improved shopping cart.

In some embodiments, the first side panel and second side panel and the end panel are rotatable along hardware including magnets fixed around a bottom frame of the shopping cart. Furthermore, the upper frame of the first side panel, second side panel, and end panel are removably attached to the first side panel and second side panel, front panel, end panel via hardware including magnets fixedly attached to an upper end of the first side panel and second side panel, front panel, and end panel respectively.

In some embodiments, the first side panel and second side panel and the end panel are rotatable along a bottom coil. Furthermore, the side panels and the end panel may be removably attached to the first side panel and second side panel and end panel via magnets attached to the upper end of the first side panel, second side panel, and end panel respectively.

In some embodiments, the first side panel and second side panel and the end panel are rotatable along a plurality of bottom rotatable members. In this embodiment, the end panel may be removably attached to the first side panel and second side panel via without limitation with bolts, latches, clamps attached to the upper end of one of the first side panel, second side panel, and end panel.

In some embodiments, the first side panel, second side panel, and end panel are rotatable along at least one hinge fixedly attached to one of the first side panel, second side panel, bottom panel, and end panel. Also, the side panels and the end panel may be removably attached to the upper frame of the first side panel, second side panel, and end panel via a plurality of magnets fixedly attached thereon.

In some embodiments, the rotation facilitating members are comprised of at least one of bottom magnets, a bottom coil, bottom hinges, and closed loops fixed on a bottom frame of the improved shopping cart.

Other embodiments of the present invention include a shopping cart improvement kit including a plurality of magnets, a plurality of fasteners, and a shopping cart panel.

BRIEF DESCRIPTION OF THE DRAWINGS

FIG. 6A is a front perspective view of different types of magnets used in the improved shopping cart according to an embodiment of the invention.

FIG. 6B is a front perspective view of an end panel used in the improved shopping cart according to an embodiment of the invention.

FIG. 6C is a front perspective view of a side clip used in the improved shopping cart according to an embodiment of the invention.

FIG. 6D is a front perspective view of a closing latch hook used in the improved shopping cart according to an embodiment of the invention.

DETAILED DESCRIPTION OF THE INVENTION

Figure 1A:
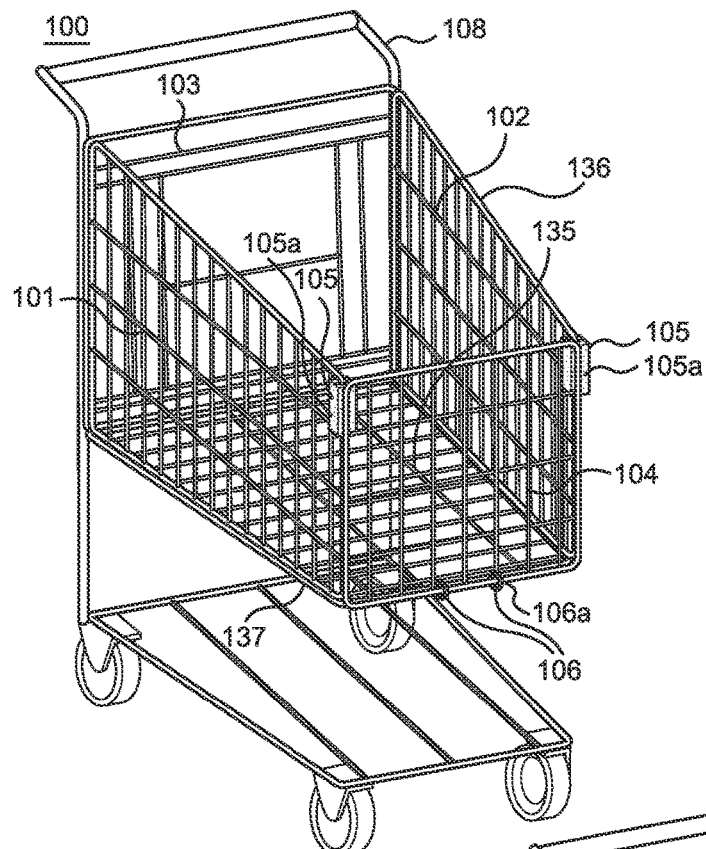
FIG. 1A is a front perspective view of the improved shopping cart with adjustable end panel illustrated in a closed position according to an embodiment of the invention.
Figure 1B:
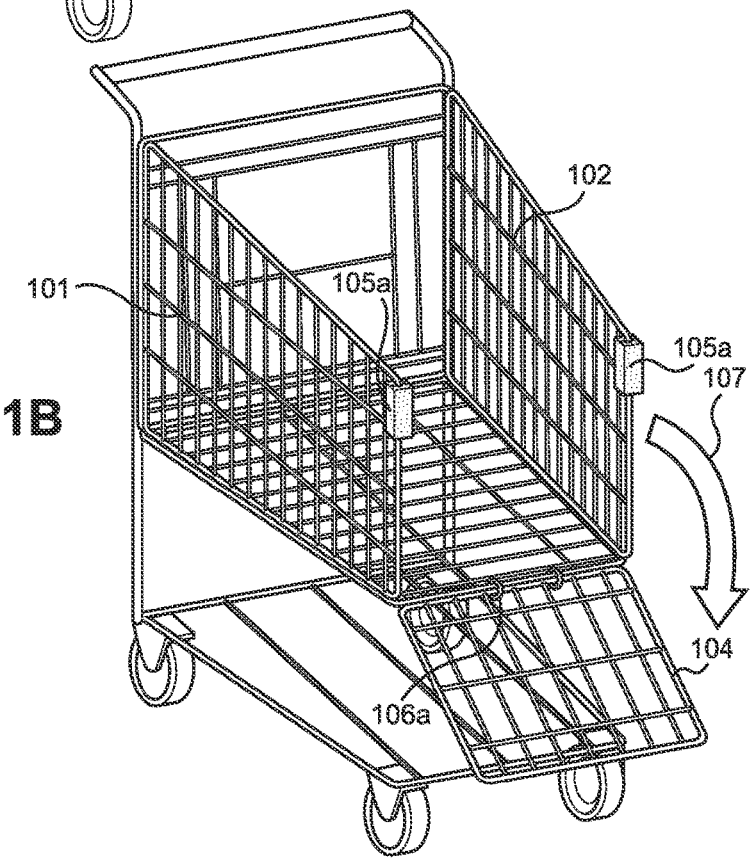
FIG. 1B is a front perspective view of an improved shopping cart with end panel opened from the panel top and attached at the panel bottom by bottom closed loops according to an embodiment of the invention.
Figure 1C:
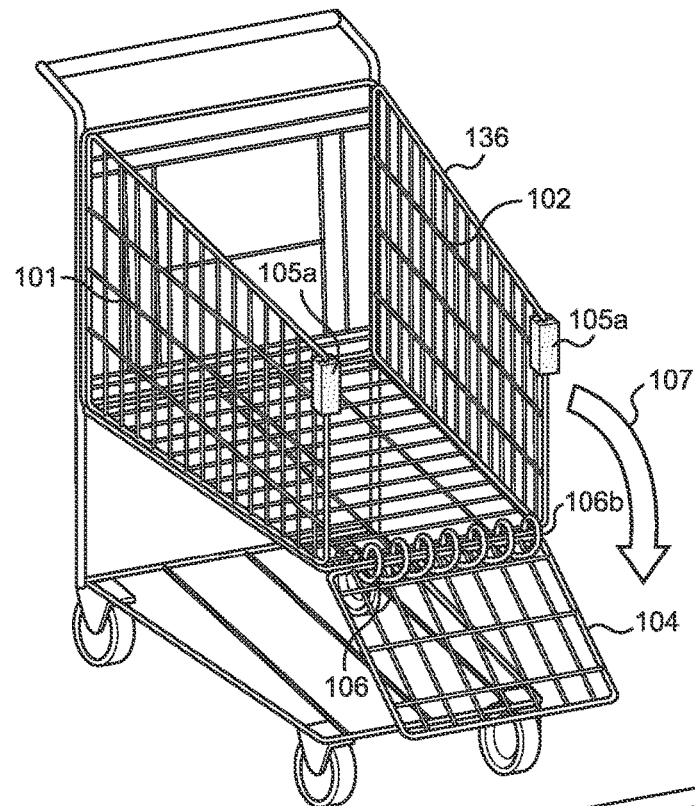
FIG. 1C is a front perspective view of an improved shopping cart with end panel opened from the panel top and attached at the panel bottom by a bottom coil according to an embodiment of the invention.
Figure 1D:
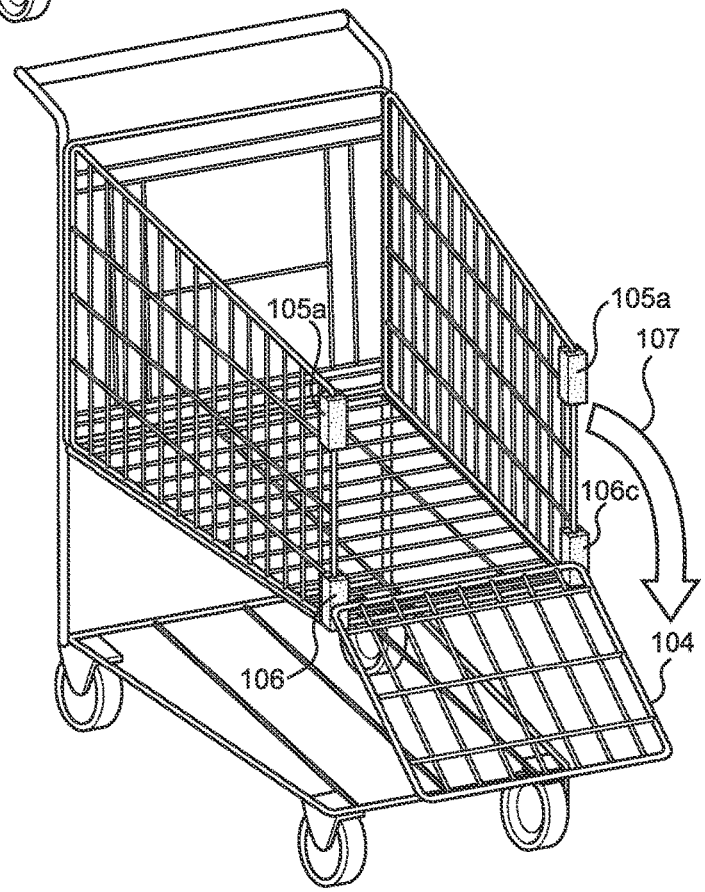
FIG. 1 D is a front perspective view of an improved shopping cart with end panel opened from the panel top and attached at the panel bottom by a plurality of magnets according to an embodiment of the invention.
Figure 2A:
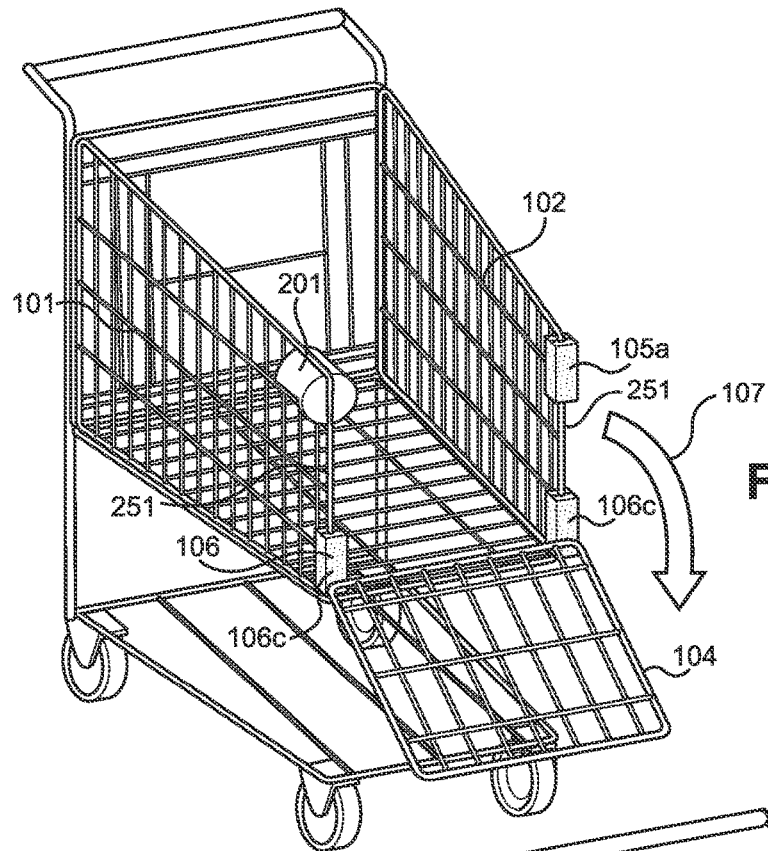
FIG. 2A is a front perspective view of an improved shopping cart with end panel opened from the panel top and attachable by a top clip that is attached at the panel bottom by a plurality of magnets according to an embodiment of the invention.
Figure 2B:
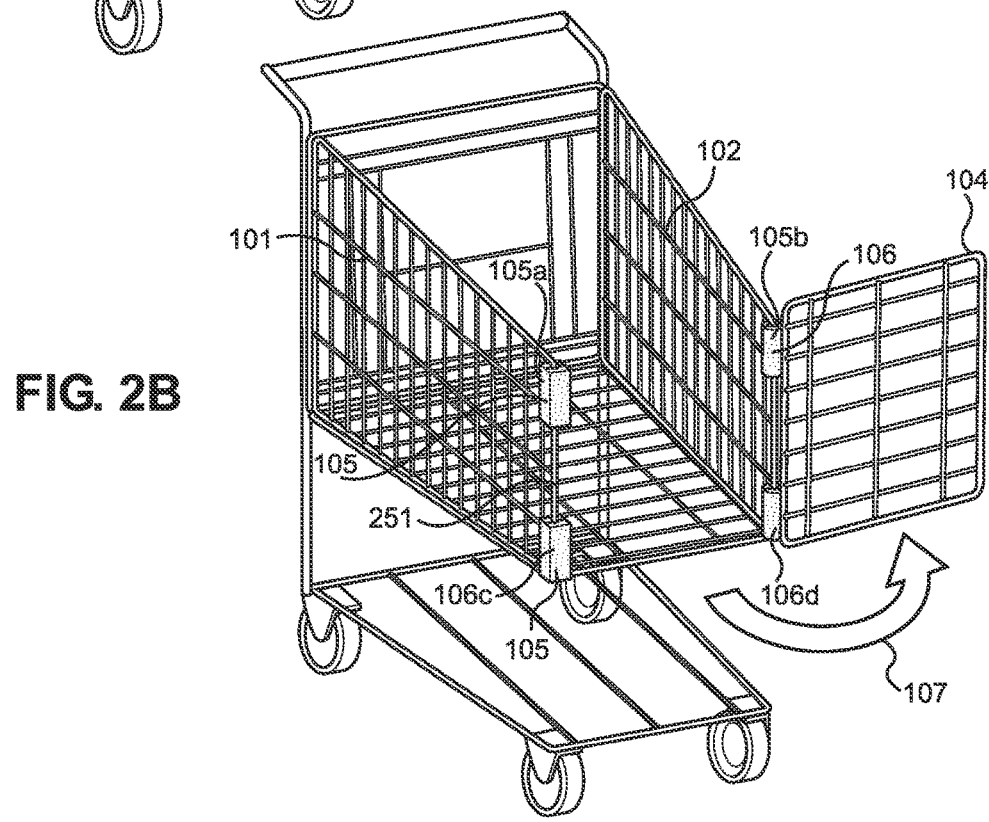
FIG. 2B is a front perspective view of the improved shopping cart with end panel opened from the side and attached by a plurality of side magnets according to an embodiment of the invention.
Figure 2C:
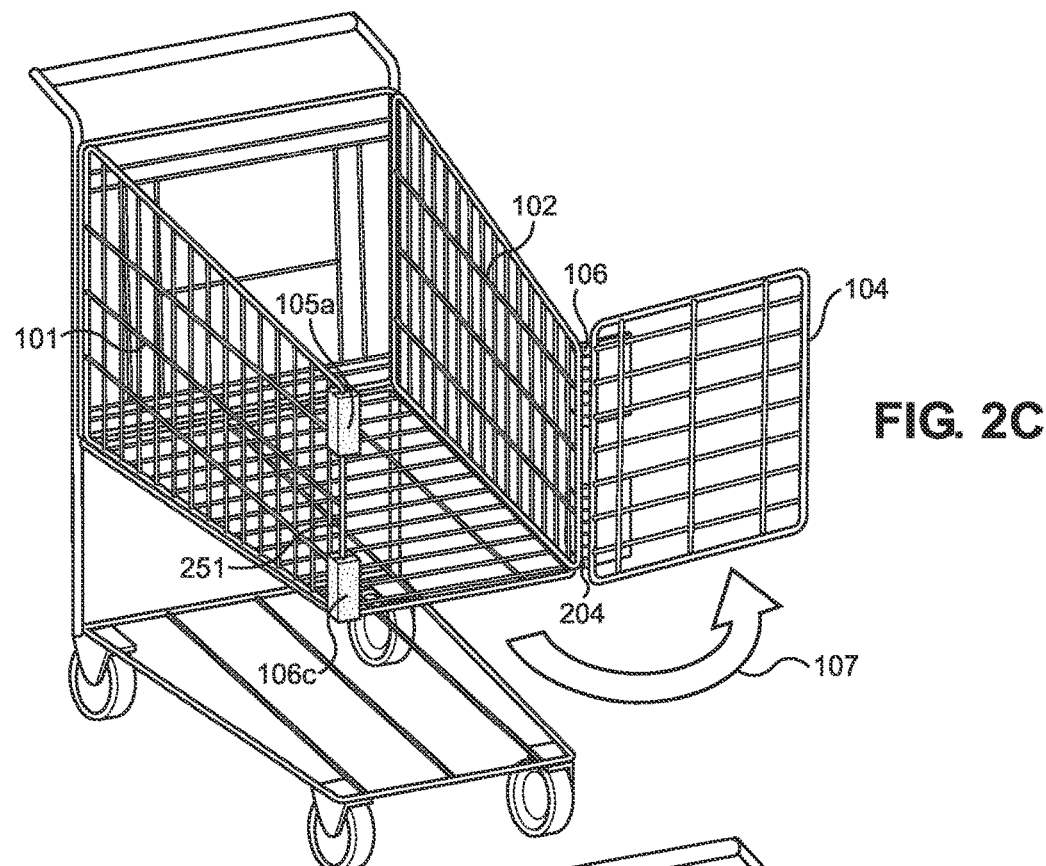
FIG. 2C is a front perspective view of the improved shopping cart with end panel opened from the side and attached by a plurality of side hinges according to an embodiment of the invention.
Figure 2D:
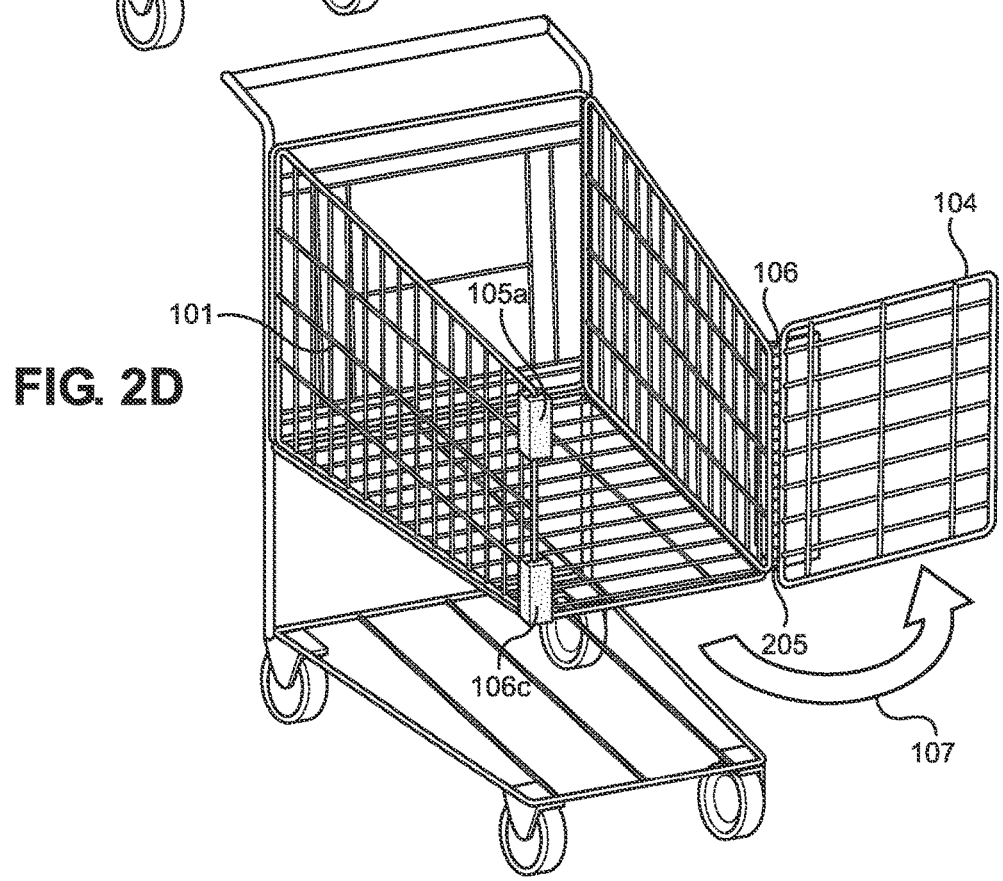
FIG. 2D is a front perspective view of the improved shopping cart with end panel opened from the side and attached by a single side hinge according to an embodiment of the invention.
Figure 3A:
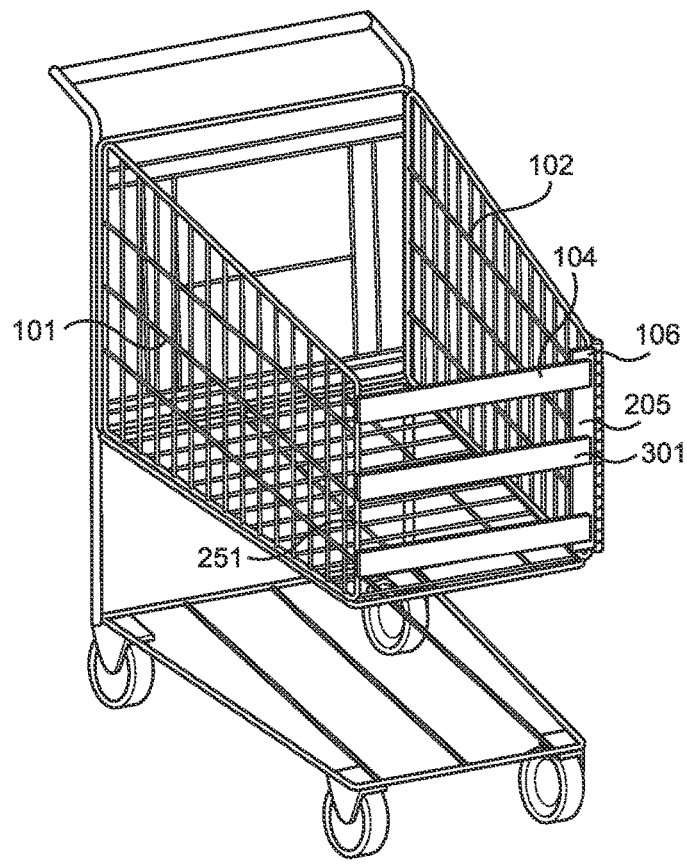
FIG. 3A is a front perspective view of the improved shopping cart with end panel consisting of magnetic panes attached to a side hinge in the closed position according to an embodiment of the invention.
Figure 3B:
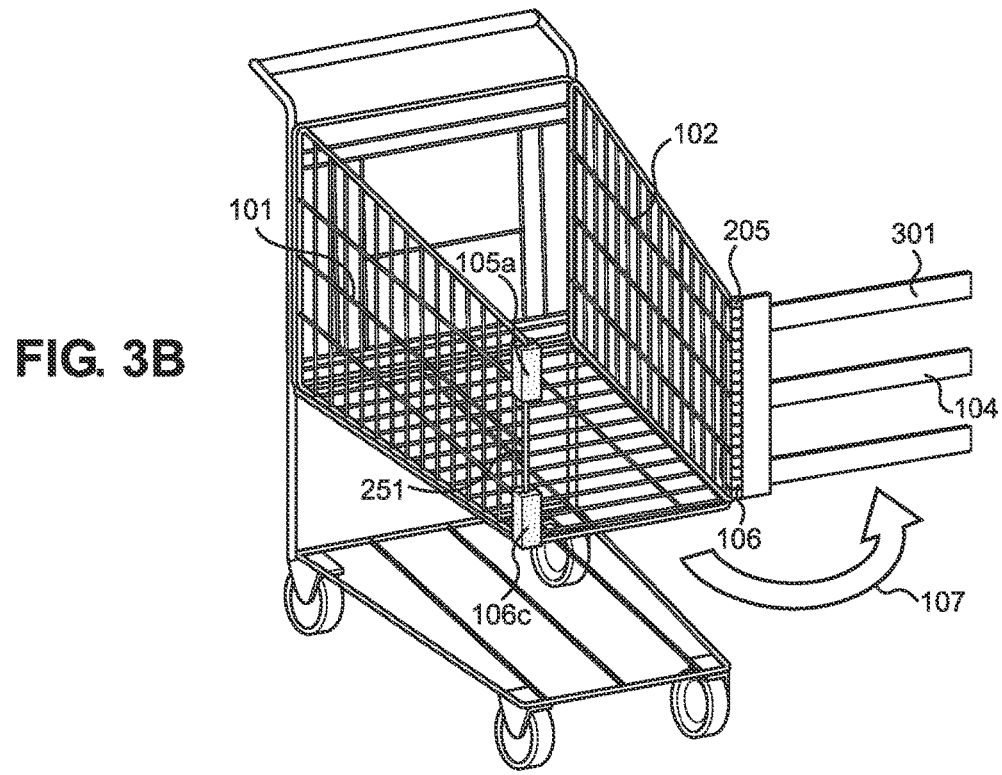
FIG. 3B is a front perspective view of the improved shopping cart with end panel consisting of magnetic panes attached to a side hinge in the open position according to an embodiment of the invention.
Figure 3C:
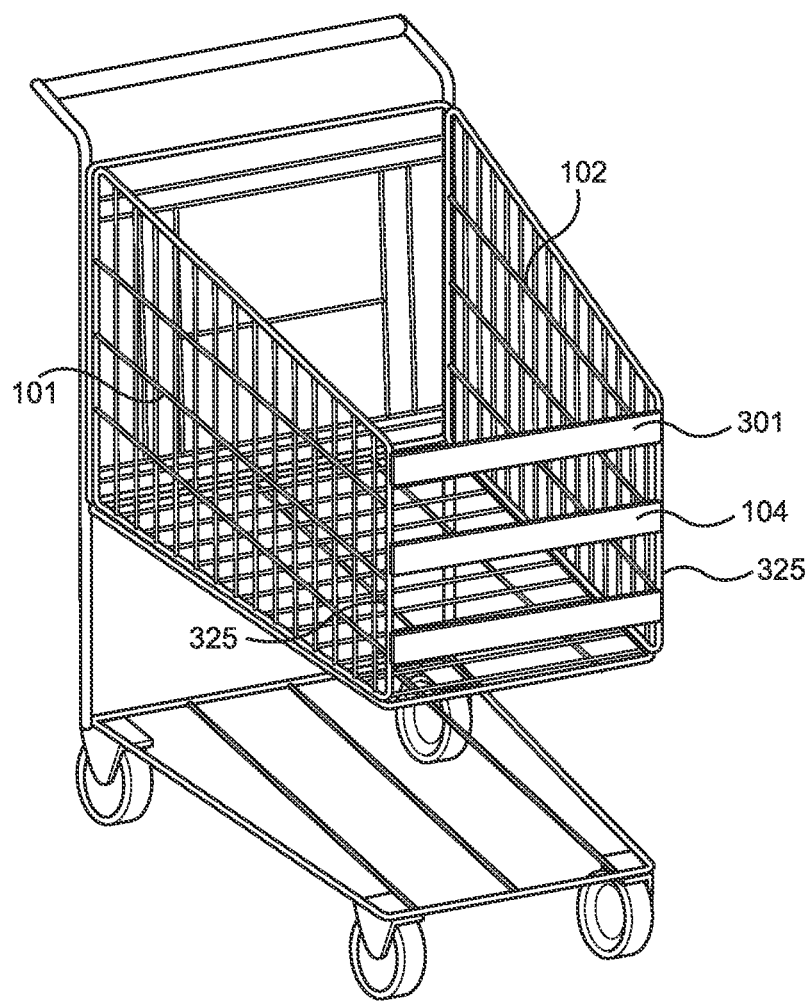
FIG. 3C is a front perspective view of the improved shopping cart with end panel consisting of magnetic panes only in the closed position according to an embodiment of the invention.

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "top" "bottom" "right" "left" and other like terms are used for the convenience of the reader in reference to the drawings. Additionally, the description may contain terminology to convey position, orientation, and direction without departing from the principles of the present invention. Such positional language should be taken in context with the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

An improved shopping cart, hereinafter the cart 100, will be described in more detail. The cart 100 may include an inside bed panel 137 perpendicular to, and surrounded by a first side panel 101, a second side panel 102, a front panel 103 and an end panel 104. A cart handle 108 may extend distally from a front portion of the cart 100 proximate the front panel 103.

In one embodiment the cart 100 may include a rotational end panel 104 that may rotate along the bottom panel utilizing a plurality of rotation facilitating members 106. In this embodiment, the rotation facilitating members 106 may be a plurality of closed loops 106a that encircle both a lower frame axis and a portion of the frame of the inside bed panel 137 proximate thereto.

The magnets may be of Neodymium, Alnico, Ceramic or Cobalt and in some embodiments may include a coating made of plastic, zinc, or the like. The cart side panels 101 and 102 and end panel 104 may be magnetically and removably attached via the attraction between the cart metal frame of the panels 101, 102, 104 and upper magnets 105a. The types of magnets that may be used with the improved cart 100 may vary depending on need, preference and circumstance. These magnets may include semicylindrical magnets 623 and channel, cylinder, or block magnets. These magnets may be structured to easily fit on the bars of a cart 100. Therefore, these magnets may be used to easily convert a traditional shopping cart to an improved cart 100.

In either embodiment, the cart 100 may transition from a closed position to an open position when the side panels 101, 102 and the end panel 104 are removed from the cart bed top-137 and are rotated vertically to a 270 degrees angle along the bottom axis of side panels 101,102, and end panel.

Like other embodiments, the end panel 104 may be removed in its entirety from the end of the cart 100.

FIG. 15E illustrates another embodiment whereby the rotation facilitating members 106 may be coils 106*b*. The coils 106*b* may be made of any number of durable and malleable material that may wrap around a lower frame axis of the end panel 104, side panels 101, 102 and the respective edges of the inside bed panel 135 proximate thereto. The coil 106*b* material may be at least one of spiraled metal, plastic, metal coated with plastic, fiber, a hybrid thereof, and the like.

FIG. 2 illustrates an embodiment whereby three panels including the first side panel 101, second side panel 102, and the end panel 104 may be rotatable along the respective perimeter of the inside panel 137. As shown, there may be a plurality of lower magnets 106*c* horizontally oriented along the inside panel 137 that may removably engage bottom frame portions of the first side panel 101, the second side panel 102 and the end panel 104. At the front panel 103 may be upper block magnets 105*a* vertically oriented along the side edges of the first side panel 101, the second side panel 102, and the end panel 104. More particularly, in some embodiments, the front panel 103 and the end panel 104 may include upper magnets 105*a* on either of their respective sides that include surfaces structured to receive side edges of the first side panel 101 and the second side panel 102. These upper magnets 105*a* may removably secure the first side panel 101 and second side panel 102 in their upright positions when needed. Likewise, these upper magnets 105*a* may secure the end panel 104 in an upright position when the side panels 101 and 102 are secured in an upright position via an upper magnet 105*a* on the front panel 103.

In this embodiment, the cart 100 may transition from a closed position to an open position when the end panel 104 and both side panels 101, 102 are removed and swung along the indicated rotational direction 107 via the coil 106*b*. This may be an arced range of 270 degrees or more below the cart bed bottom 137.

In some embodiments, utilizing the coil 106*b* there may be upper bar. This may simply be a curved interior tunnel to secure the magnet to a shopping cart bar. In other embodiments, the curved interior tunnel may be supplemented with a perpendicularly oriented tunnel to accommodate the crisscrossed bar structure of cart panels.

Figure 4A:
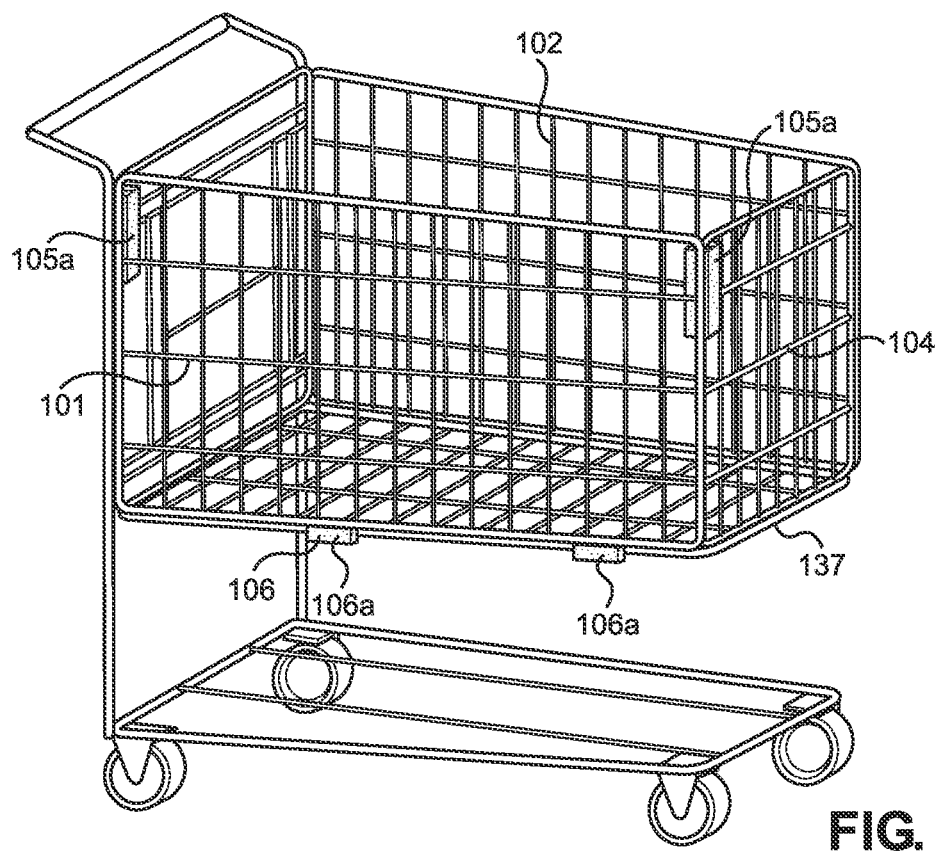
FIG. 4A is a side perspective view of the improved shopping cart with adjustable side panel illustrated in a closed position according to an embodiment of the invention.

Also shown by FIG. 4A is a block magnet 602 that may be used with the improved cart 100. Included in the block magnet 602 may be a bar attachment tunnel 604 located through the longitudinal center thereof. Furthermore, the block magnet 602 may be bifurcated along the shown bifurcating line 603 to facilitate the magnet being attachable to a cart 100 that has been constructed before improvement. Furthermore, the bar attachment tunnel 604 may be structured to accommodate the geometric configuration of the cart segment it is to be attached. Like the cylinder magnet 601, in some embodiments this may simply be a curved interior tunnel to secure the magnet to a shopping cart bar. In other embodiments, the curved interior tunnel may be supplemented with a perpendicularly oriented tunnel to accommodate the crisscrossed bar structure of cart panels. Furthermore, the magnet 604 may be polygonal with a plurality of flat faces 630 structured to facilitate the engagement of a cart panel thereon.

Figure 4B:
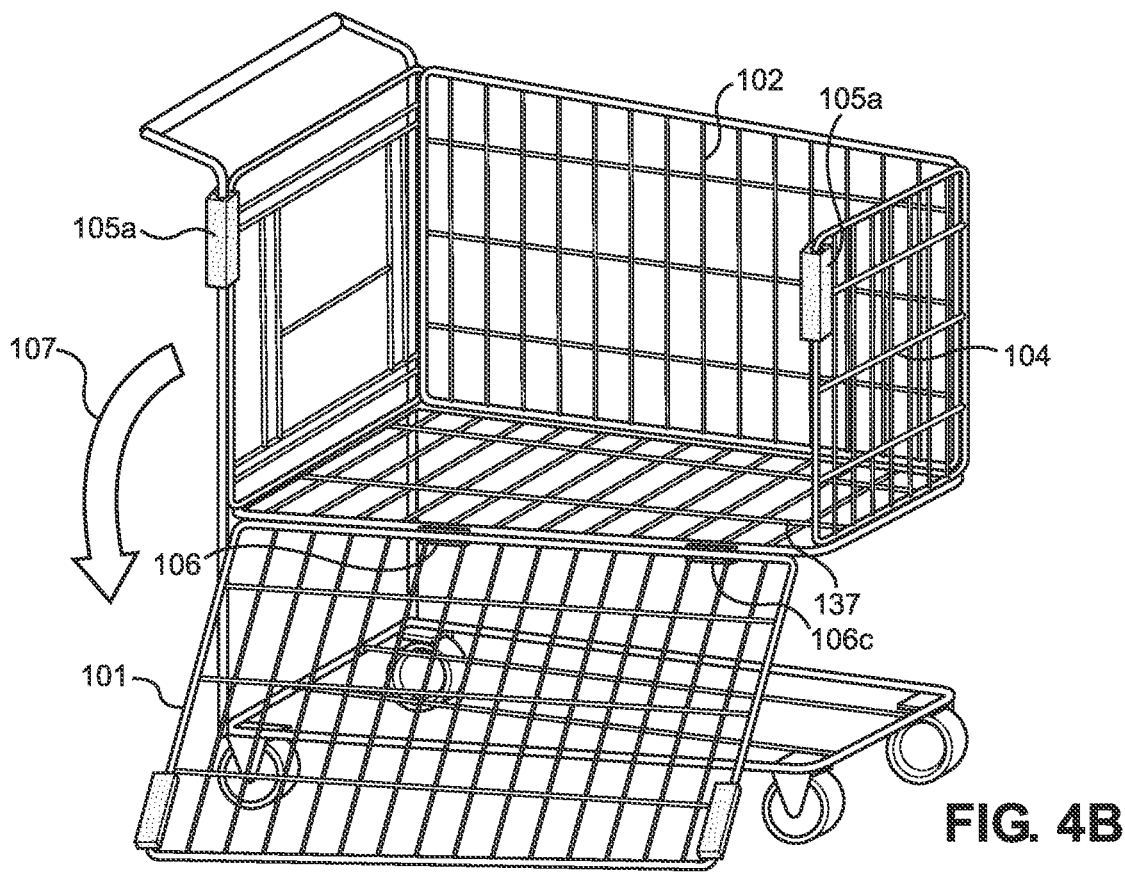
FIG. 4B is a side perspective view of the improved shopping cart with adjustable side panel illustrated in an open position according to an embodiment of the invention.

FIG. 4B illustrates an improved end panel 605 that may be associated with an improved cart 100. In this embodiment, the end panel 605 may include a pair of attachment loops 607 at opposing upper corners of the end panel 605. The attachment loops 607 may be circular extensions of the upper edge of the end panel 605 structured to accommodate the horizontally oriented upper edge of the side panels 101, 102. With this improved end panel 605, the existing end panel of the cart 100 can be removed and this improved end panel 605 can be fitted onto the extended upper edge bars that would protrude from the respective end of the cart 100. These attachment loops 607 may act as the upper fastening members 105 in lieu of other fastening members 105 mentioned herein.

Additionally, the improved end panel 104 may include a pair of handle loops 606 at opposing upper corners of the end panel 605 just outside the attachment loops 607. In some embodiments, the handle loops 606 may be circular extensions of the upper edge of the end panel 605 continued from the attachment loops 607. In other embodiments, the handle loops 606 may be separate members soldered or attached by other means to the end panel 104. In any embodiment, the handle loops 606 may be used as a facilitating means to grab and pull the end panel 104 from the top of the cart 100 and rotate it downward to an open position.

Figure 4C:
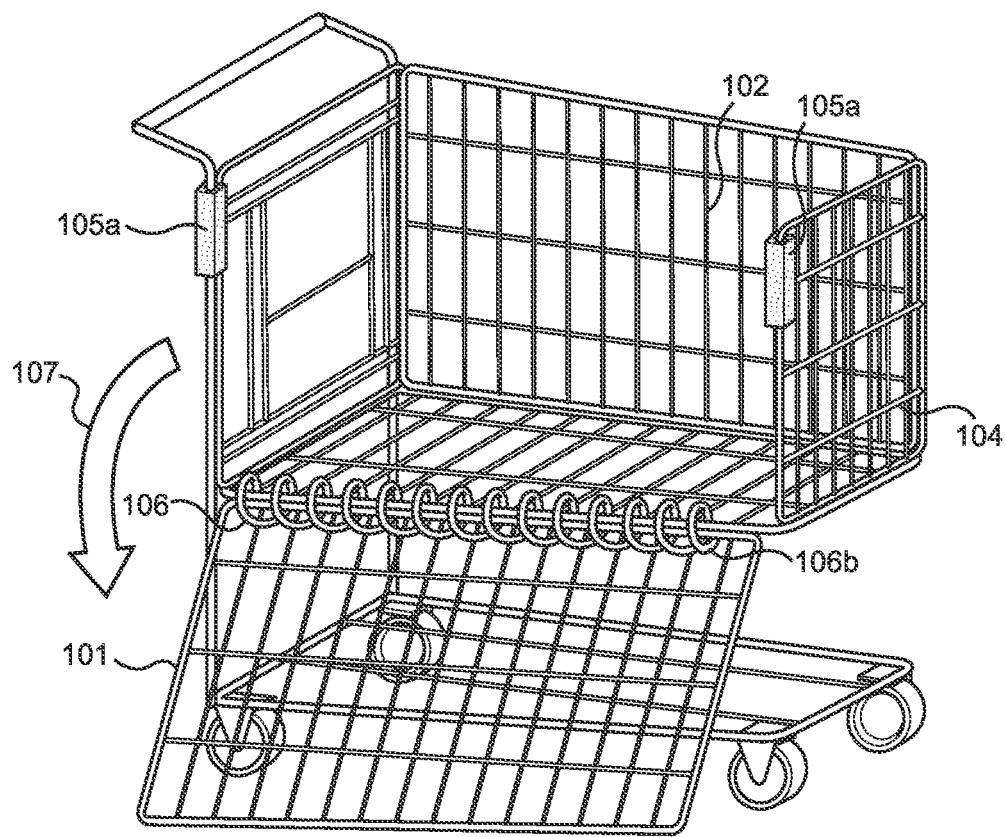
FIG. 4C is a side perspective view of the improved shopping cart with adjustable side panel illustrated in an open position and attached at the panel bottom by a bottom coil according to an embodiment of the invention.

FIG. 4C illustrates the clamp 609 that may be used with the improved cart 100. Like the magnets 601, 602, the clamp 609 may be bifurcated into a first segment 611 and a second segment 612 separated by an attachment channel 615 to facilitate the clamp 609 being attachable to a cart 100 that has been constructed before improvement. Furthermore, the attachment channel 615 may be structured to accommodate the geometric configuration of the cart segment it is to be attached. Like the magnets 601, 602 in some embodiments this may simply be a curved interior tunnel to secure the clamp 609 to a shopping cart bar. In other embodiments, the attachment channel 615 may be supplemented with a perpendicularly oriented tunnel to accommodate the crisscrossed bar structure of cart panels. In any embodiment, the front face 616 of the clamp 609 may be structured to accommodate a vertically oriented end panel bar to removably secure the end panel 104 to the cart 100.

Figure 4D:
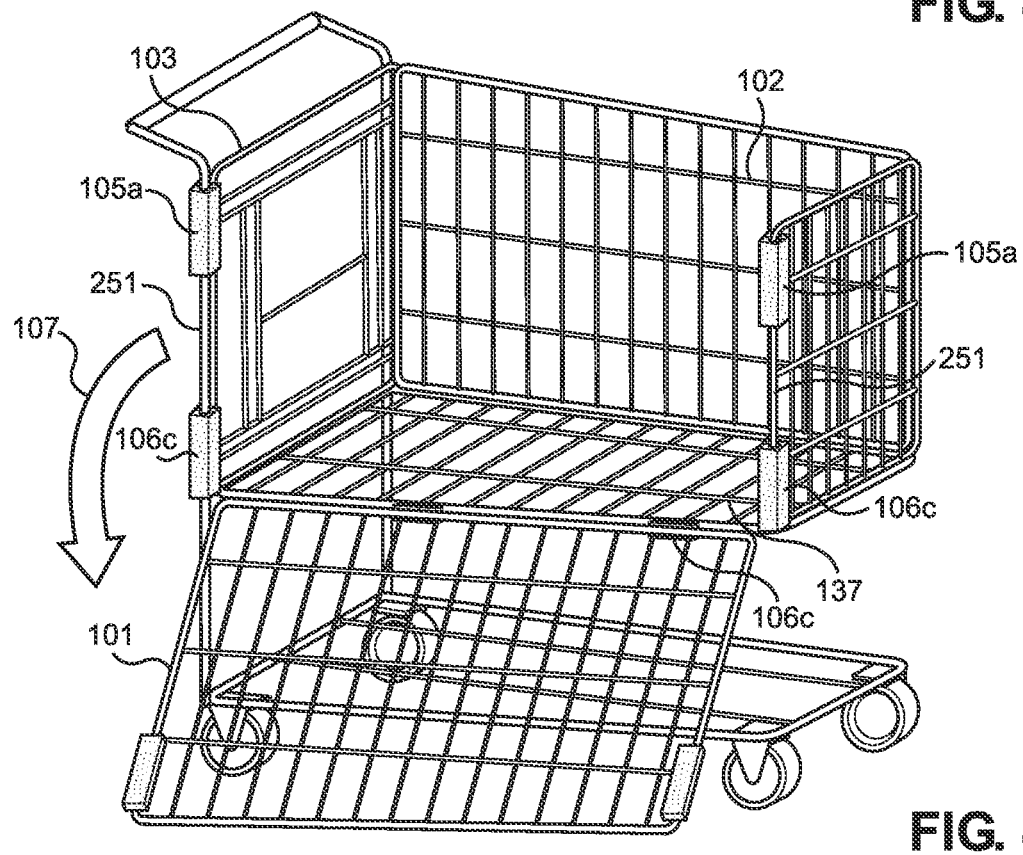
FIG. 4D is a side perspective view of the improved shopping cart with side panel opened from the panel top and attached at the panel bottom by a plurality of magnets according to an embodiment of the invention.
Figure 5A:
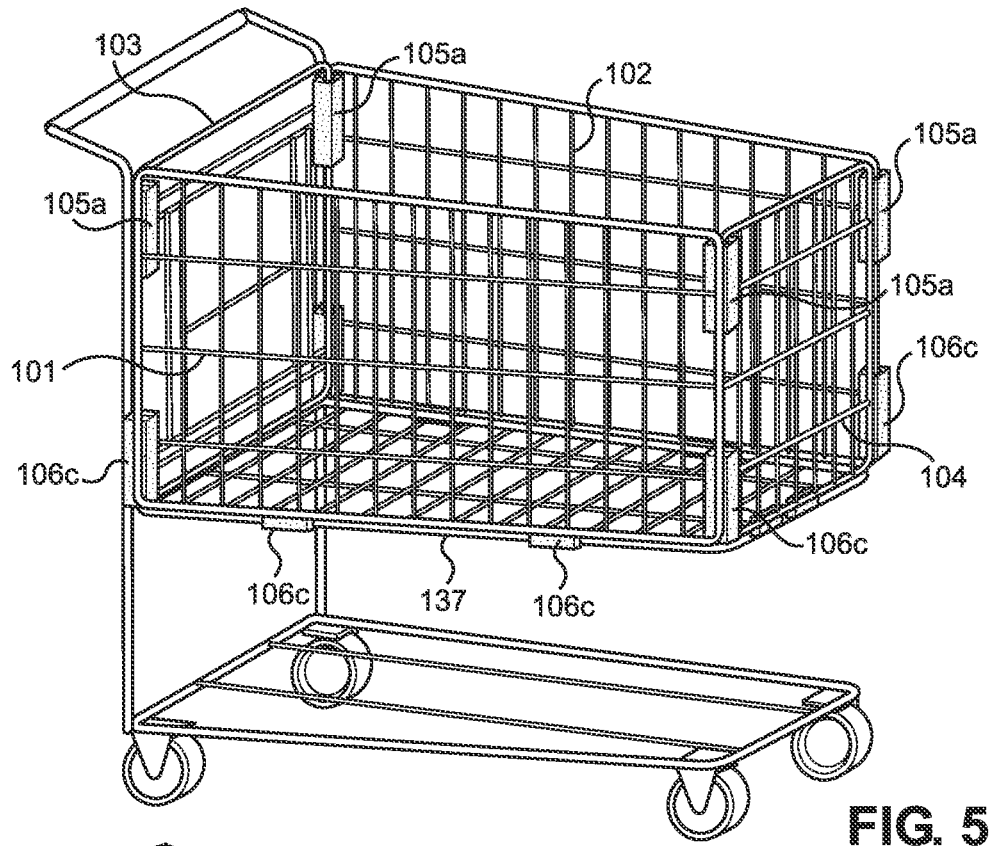
FIG. 5A is a side perspective view of the improved shopping cart with at least three adjustable panels in the closed position according to an embodiment of the invention.
Figure 5B:
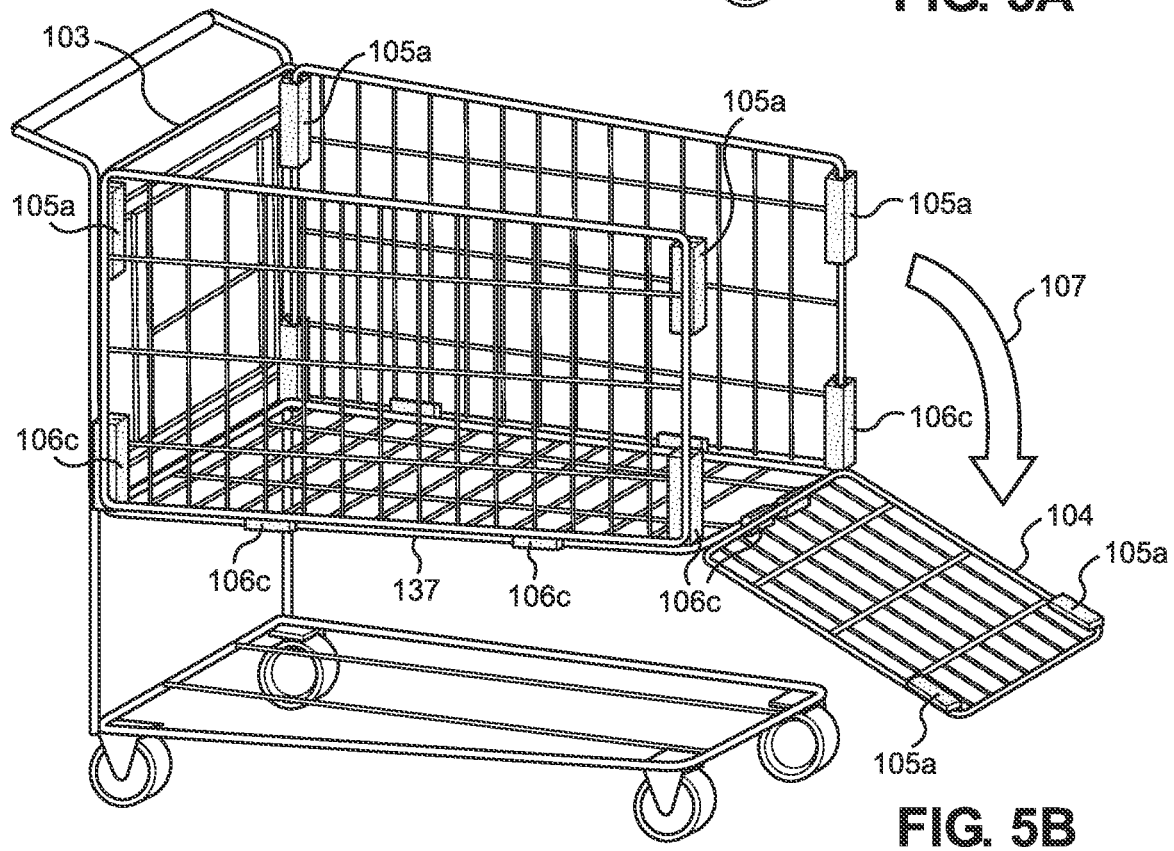
FIG. 5B is a side perspective view of the improved shopping cart with at least three adjustable panels with end panel opened according to an embodiment of the invention.
Figure 5C:
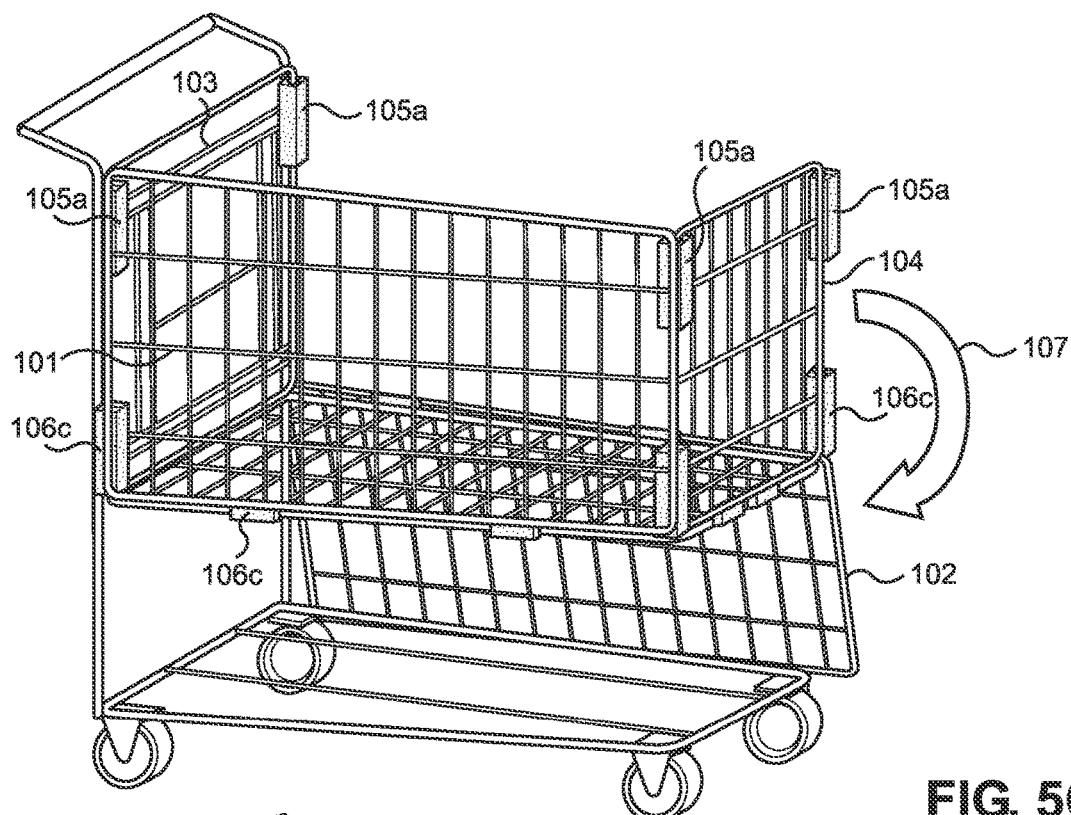
FIG. 5C is a side perspective view of the improved shopping cart with at least three adjustable panels with side panel opened according to an embodiment of the invention.
Figure 5D:
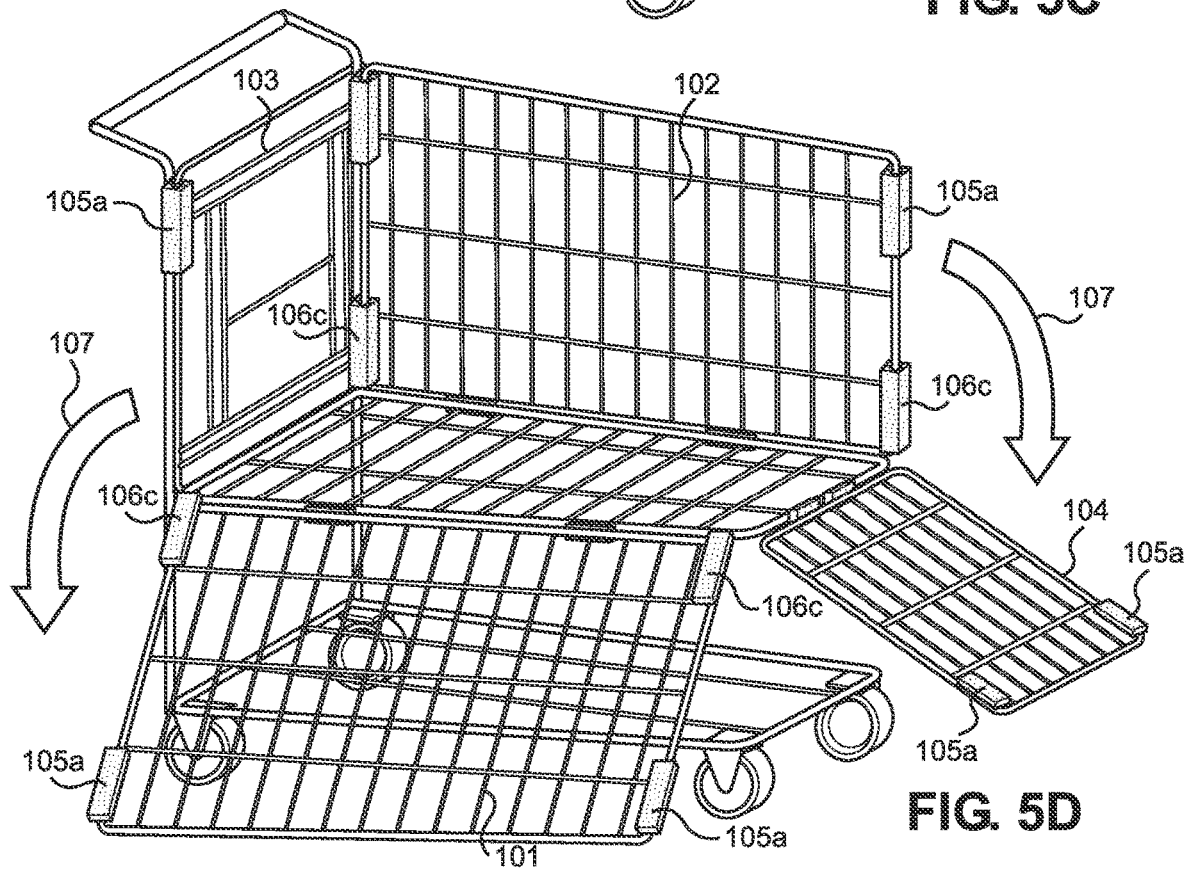
FIG. 5D is a side perspective view of the improved shopping cart with at least three adjustable panels with side panel and end panel opened according to an embodiment of the invention.
Figure 5E:
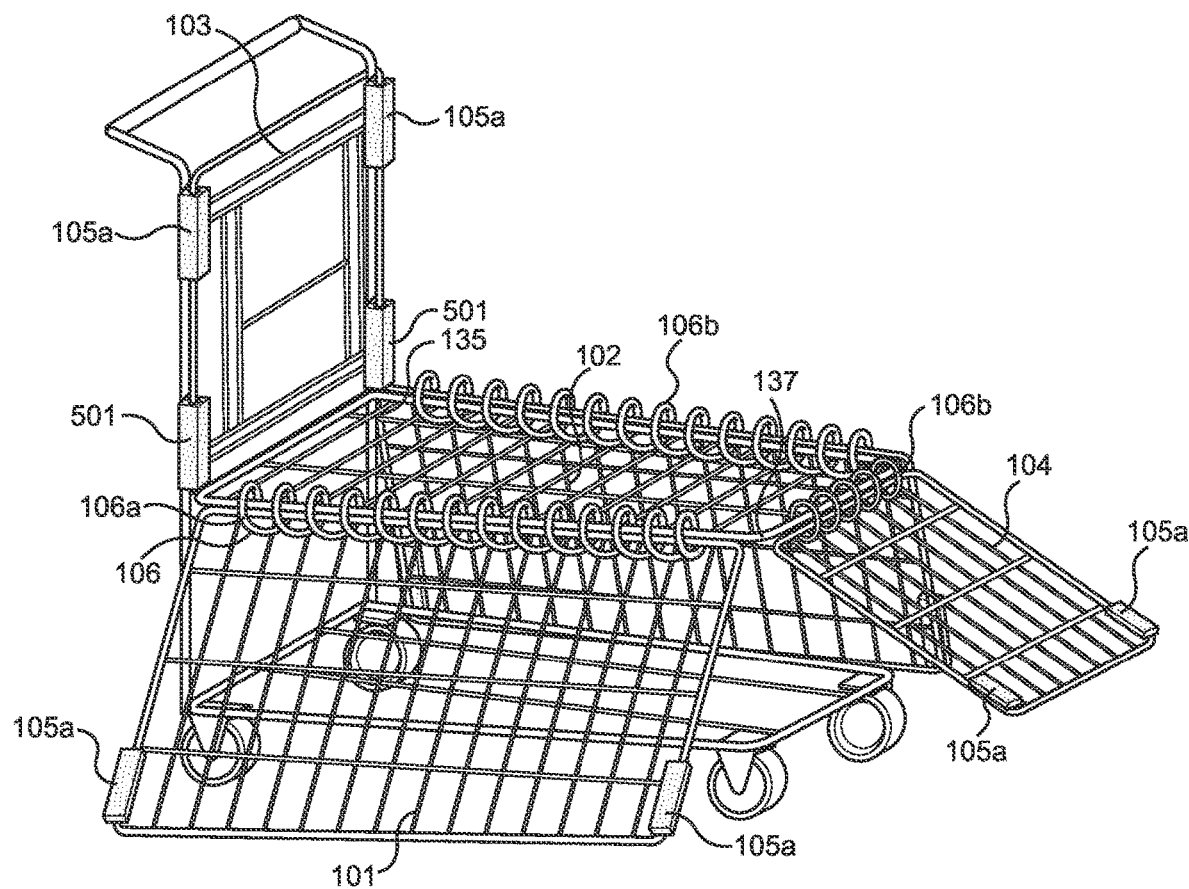
FIG. 5E is a side perspective view of the improved shopping cart with three adjustable panels with all three panels opened according to an embodiment of the invention.
Figure 6E:
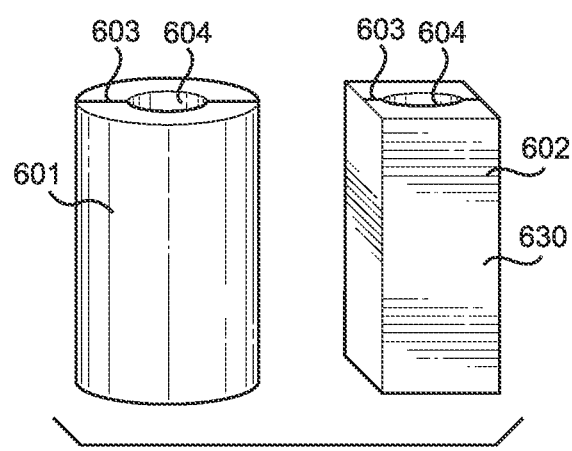
FIG. 6E is a front perspective view of different types of magnets used in the improved shopping cart according to an embodiment of the invention.
Figure 6E:
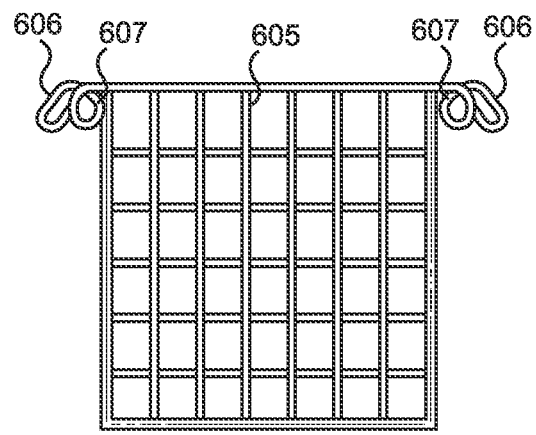
Figure 6E:
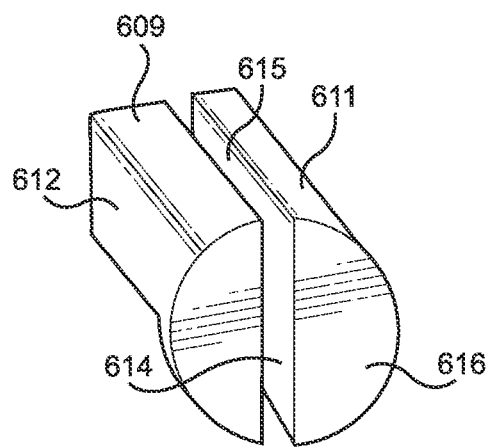
Figure 6E:
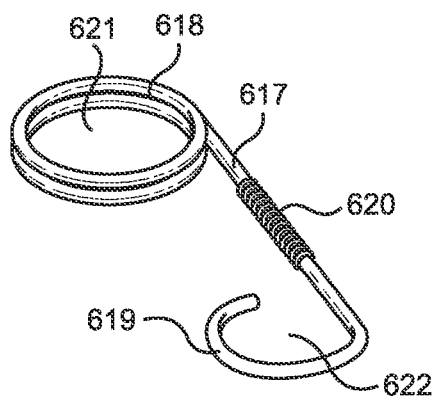
Figure 6E:
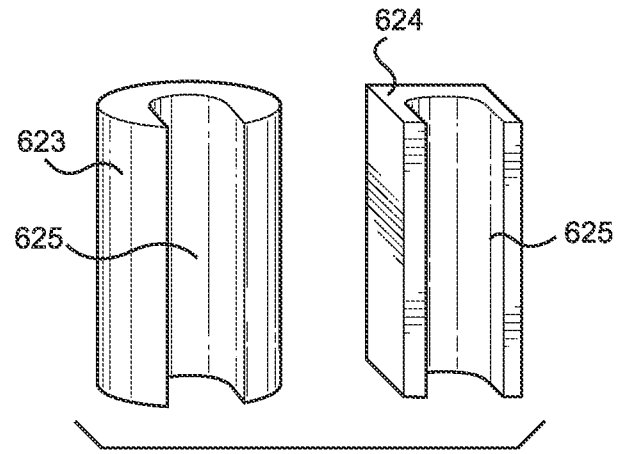
Figure 7:
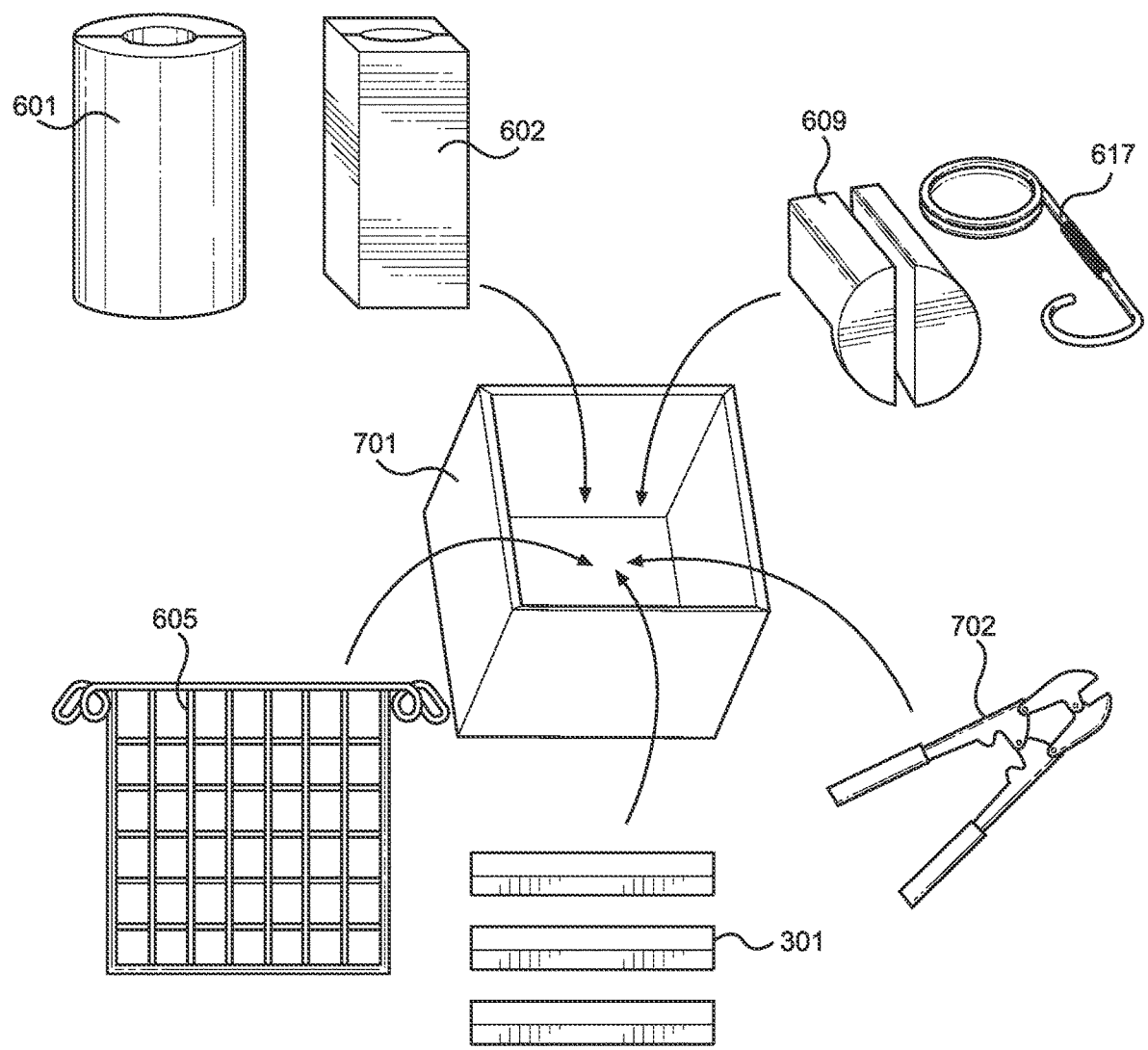
FIG. 7 is a top perspective view of an improvement kit used to transform a shopping cart according to an embodiment of the invention.

FIG. 4D shows a receiving hook 617 that may be used with the improved cart 100. Similar to the clamp 609, the receiving hook 617 may be structured to accommodate a vertically oriented end panel bar to removably secure the end panel 104 to the cart 100. The receiving hook 617 may include a closed attachment end 618, which may be a circular end structured to accommodate a vertically oriented side panel and fixedly attach the receiving hook 617 thereto. The opposing end of the receiving hook 617 may be a curved open end 619 structured to receive and removably secure an end panel 104 to a side panel 101, 102. An elongate flexible medial member 620 may be bendable. This may allow the receiving hook 617 to stretch to expose the curved open end to allow an end panel 104 to be ensnared by the panel receiving area 622 or allow for the receiving hook 617 to release the end panel 104. In any embodiment, the receiving hook 617 may be structured to accommodate a vertically oriented end panel bar to removably secure the end panel 104 to the cart 100.

FIG. 4E illustrates different types of magnets that may be used with the improved cart 100. These magnets may include semi-cylindrical magnets 623 with a bar attachment channel and a semi-block magnet 624 with a bar attachment channel 625.

These magnets 623, 624 may be structured to easily fit on the bars of a cart 100. Therefore, these magnets may be used to easily convert a traditional shopping cart to an improved cart 100.

Figure 8:
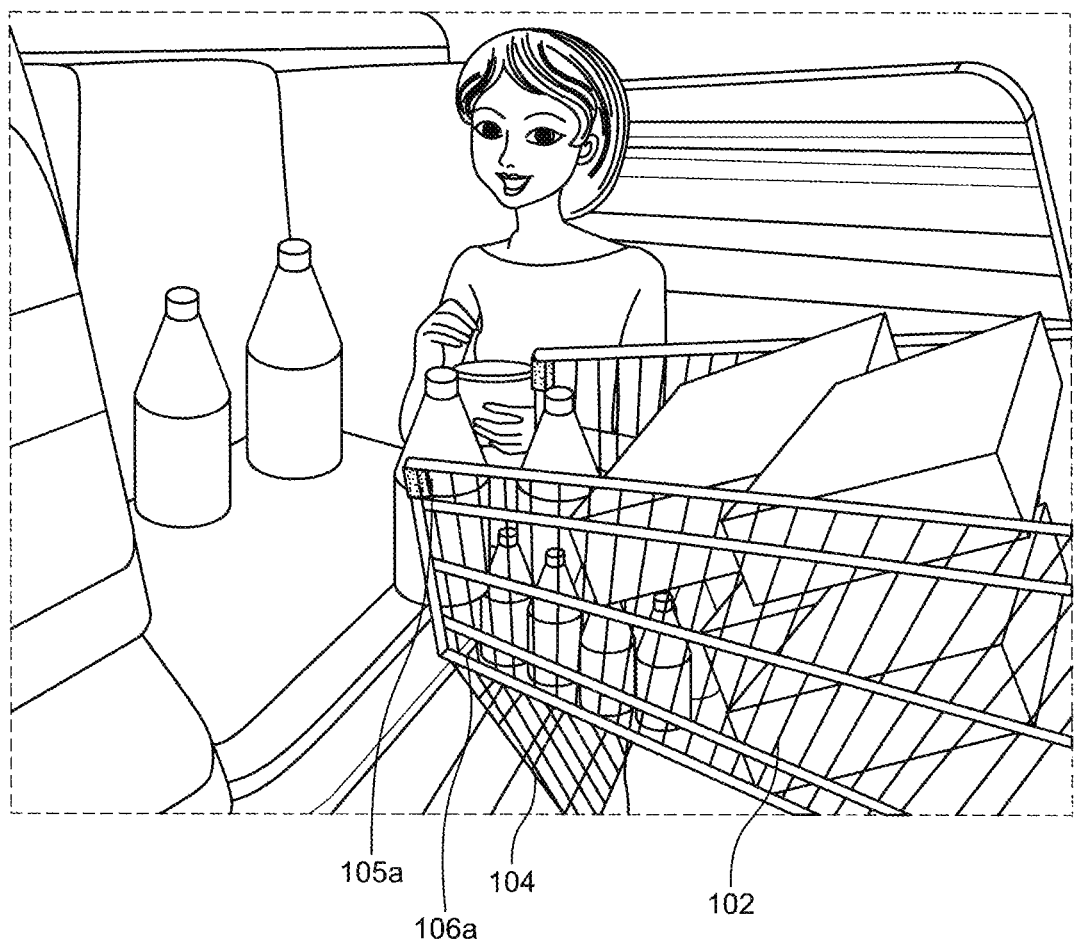
FIG. 8 shows the front panel rotated downward up to 270 degrees in an open position to permit the cart to be positioned to the edge of the trunk of a vehicle to facilitate the unloading of heavy or supersized goods from the cart by sliding the goods in lieu of lifting the goods. By way of non-limiting examples, the trunk of the vehicle in FIG. 8 may be exchanged with surfaces such a kitchen pantry, warehouse shelves, containers, to load and unload heavy or supersized items to and from the improved shopping cart.

FIG. 8 shows the front panel 104 rotated downward up to 270 degrees in an open position to permit the cart 100 to be positioned to the edge of the trunk of a vehicle to facilitate the unloading of goods from the cart by sliding the goods in lieu of lifting the goods. By way of anon-limiting examples, the trunk of the vehicle in FIG. 8 may be exchanged with surfaces such as a kitchen pantry, warehouse shelves, and containers, to load and unload heavy or supersized items to and from the improved shopping cart.

Consumers are the beneficiaries of this invention. To expedite to the consumers the availability, and at a much lower cost, of the improved shopping cart and rather than waiting for a brand new cart to be manufactured, an existing shopping cart can be retrofitted to meet this invention in less than half an hour using a kit comprising but not limited to a plurality of hardware including magnets and common power tools.

An improvement kit may come with all or some of the listed components as well as other components listed within this application.

It should be noted that while some embodiments of the improved cart 100 show specific attachment and rotation components such as block magnets, hinges, closed loops, many of the components may be interchanged in a variety of combinations to carry out the purpose of the invention. By way of non-limiting example, the block magnets may be exchanged with cylinder, channel, and custom made magnets in some embodiments. Furthermore, in other embodiments the magnets, hinges may be exchanged with slide bolt latches. Also, the bottom magnets may in some embodiments be closed loops, hinges or the like. Likewise, a combination of any of the components may be mixed to create a unique and improved shopping cart 100 as contemplated and described within the scope of this application. Furthermore, the end panel 104 may be a new panel or a panel that has been cut out off of an existing shopping cart and removably attached to the cart bed top 136 via a plurality of fastening members 105. Some embodiments include the improved cart as a flat bed shopping cart with downwardly rotatable panels.

The improved shopping cart does not interfere with the nesting of other shopping carts. The front panel may be repositioned back to its original closed orientation and the improved cart will nest with other improved or standard shopping carts.

That which is claimed is:

1. An improved shopping cart comprising:
    a first side panel, a second side panel, a front panel, bottom panel and end panel 104;
    a plurality of fastening members attached to the outer frame of at least one of the first side panel, second side panel, and front panel;
    a plurality of rotation facilitating members attached to the outer frame of at least one of the first side panel, second side panel and front panel;
    a plurality of mounting hardware attached to the outer frame of at least one of the first side panel, second side panel and front panel;
    wherein the front panel is removably attached to at least one of the first side panel and second side panel;
    wherein the end panel 104 is rotatable with respect to the improved shopping cart;
    the first side panel and second side panel are fixed and the front panel is rotatable along closed bottom hooks fixed around a bottom frame of the shopping cart; and
    wherein a front panel upper frame is removably attached to the first side panel and second side panel via a flat surface of a magnet fixedly attached to an upper end of the first side panel and second side panel respectively.

2. The improved shopping cart of claim 1 wherein the front panel may be rotated downward up to 270 degrees to an open position.

3. The improved shopping cart of claim 1 wherein the improved shopping cart does not interfere with the nesting of other shopping carts.

\* \* \* \* \*

UNITED STATES PATENT AND TRADEMARK OFFICE
CERTIFICATE OF CORRECTION

PATENT NO. : 11,305,801 B2
APPLICATION NO. : 17/197590
DATED : April 19, 2022
INVENTOR(S) : Rosemonde W. Killy Page 1 of 1

It is certified that error appears in the above-identified patent and that said Letters Patent is hereby corrected as shown below:

In the Specification

Column 4 Line 1:
front panel
Should be changed to:
---end panel---

Column 7 Line 5:
front panel
Should be changed to:
---end panel---

Signed and Sealed this
Thirty-first Day of May, 2022

Katherine Kelly Vidal
*Director of the United States Patent and Trademark Office*